Feb. 24, 1942. C. C. FARMER 2,273,944
LOCOMOTIVE BRAKE EQUIPMENT
Filed Feb. 28, 1941
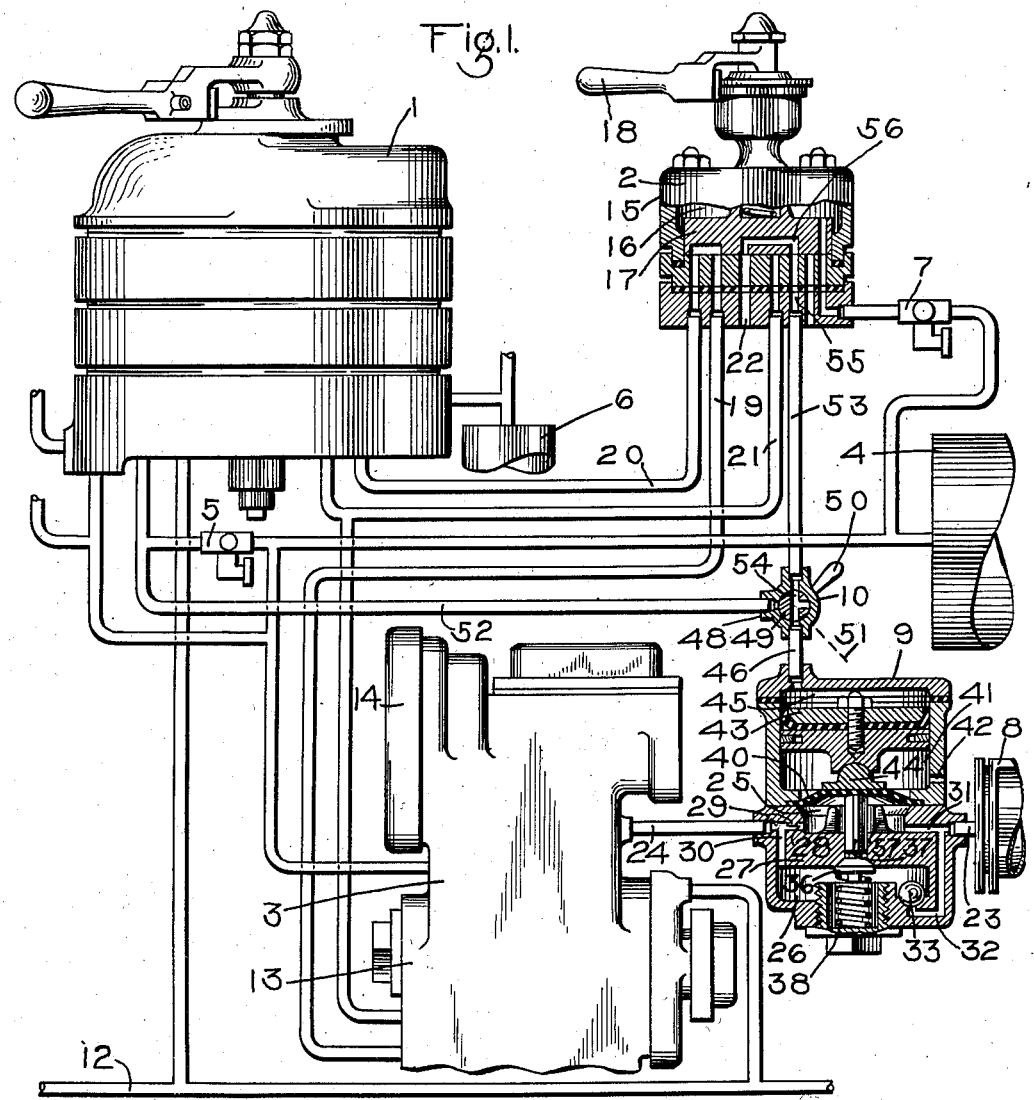
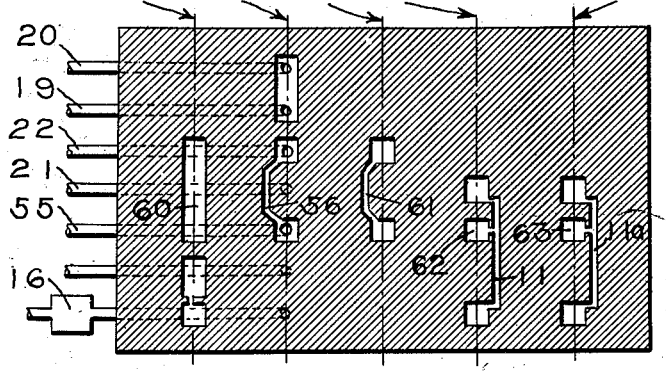
INVENTOR
CLYDE C. FARMER
ATTORNEY Patented Feb. 24, 1942

2,273,944

UNITED STATES PATENT OFFICE 2,273,944

LOCOMOTIVE BRAKE EQUIPMENT

Clyde C. Farmer, Pittsburgh, Pa., assignor to The Westinghouse Air Brake Company, Wilmerding, Pa., a corporation of Pennsylvania Application February 28, 1941, Serial No. 381,001

12 Claims. (Cl. 303—40)

This invention relates to fluid pressure brakes and more particularly to the combined automatic and straight air type employed on locomotives for controlling the brakes on the locomotive and cars of a train.

When the engineer on the locomotive of a train operates the usual automatic brake valve device to effect a reduction in brake pipe pressure, the brakes on the train apply serially from the front end of the train toward the rear end thereof. As a result, the brakes on the front end of the train become applied ahead of those at the rear end and the slack in the train tends to run in against the locomotive. On long trains this gathering of slack may result in the development of violent shocks and damage to parts of the train. Such damaging shocks do not however develop in shorter trains where the amount of slack is less.

One object of the invention is the provision of improved means for delaying the application of brakes on the locomotive upon a reduction in brake pipe pressure so that the inertia of the locomotive may be effective to retard the gathering of slack in a long train so as to prevent the development of excessive and damaging shocks.

Another object of the invention is the provision of improved delay means adapted to operate upon a reduction in brake pipe pressure to either delay the application of locomotive brakes or to provide for the normal rate of application so as to thereby be adapted for use in connection with either long trains or short trains, there being provided manually operative means for selectively conditioning said delay means in accordance with the train length.

Still another object of the invention is the provision of improved brake application delay means such as just set forth which is so designed that when conditioned to delay the application of brakes on the locomotive upon a reduction in brake pipe pressure, said means will operate automatically in response to normal operation of the usual independent brake valve device on the locomotive to provide a normal rate of independent brake application on the locomotive.

A further and important object of the invention is the attainment of the above objects in the well known No. 6-ET locomotive brake equipment merely by a slight modification of the independent brake valve device and by the addition to said equipment of a simple delay valve device and of a two-position selector cock.

Other objects and advantages will be apparent from the following more detailed description of the invention.

In the accompanying drawing; Fig. 1 is a diagrammatic view, partly in section and partly in outline, of a locomotive brake equipment embodying the invention, and Fig. 2 is a diagrammatic development view of the rotary valve and seat of the independent brake valve device shown in Fig. 1.

As shown in the drawing, the brake equipment comprises an engineer's automatic brake valve device 1, an independent brake valve device 2, a distributing valve device 3 and the usual main reservoir 4, feed valve device 5, equalizing reservoir 6, and reducing valve device 7, all of which parts are identical to corresponding parts of the well known No. 6-ET locomotive brake equipment except the independent brake valve device 2 which is provided with slight modifications to be later described. According to the invention, there is added to this No. 6-ET locomotive brake equipment a delay valve device 9 and a selector cock 10 and such piping as required to connect said device and cock into the equipment.

As is well known, the automatic brake valve device 1 is provided for operation by the engineer to control the pressure of fluid in a brake pipe 12 through the medium of which the brakes on the locomotive and cars of a train are adapted to be controlled on the usual automatic principle. To effect an application of brakes on the locomotive and train the brake valve device 1 is operative to effect a reduction in pressure in the brake pipe 12, while to effect a release of brakes on the locomotive and train the brake valve device 1 is operative to effect an increase in pressure in the brake pipe 12.

The distributing valve device 3 comprises the usual equalizing portion 13 and application portion 14. The equalizing portion 13 is controlled by variations in pressure in the brake pipe 12 and is adapted to operate upon a reduction in pressure in said brake pipe to supply fluid to the application portion 14 at a pressure depending upon the degree of brake pipe reduction. The application portion 14 is adapted to operate in accordance with the pressure of fluid supplied thereto to supply fluid at a corresponding pressure from the main reservoir 4 to the brake cylinder device 8 to apply the brakes on the locomotive. Upon an increase in pressure in the brake pipe, the equalizing portion 13 is adapted to operate to release fluid under pressure from the application portion 14 which then in turn is operative to release fluid under pressure from the brake cylinder 8 to release the brakes on the locomotive.

The independent brake valve device 2 is of usual construction comprising a casing 15 having a chamber 16 supplied with fluid under pressure from the reducing valve device 7 and containing a rotary valve 17 adapted to be turned to the well known different brake controlling positions indicated in Fig. 2, by movement of a handle 18.

In Fig. 1 the rotary valve 17 is shown in the running position in which the usual distributing valve release pipe 19, connected to the equalizing portion 13 of the distributing valve device, is connected to pipe 20 leading to the automatic brake valve device 1. Through this communication fluid under pressure is adapted to be released from the application portion 14 of the distributing valve device when the automatic brake valve device 1 is in its running position for releasing the brakes on the locomotive of a train. The rotary valve 17 also has the usual slow and quick application positions for connecting the application cylinder pipe 21 to rotary valve chamber 16 by way of ports 11 and 11a, respectively, in the rotary valve, as shown in Fig. 2, so as to supply fluid under pressure from the reducing valve device 7 to the application portion 14 of the distributing valve device 3 to effect operation thereof to apply the brakes on the locomotive independently of the brakes on the train. In the usual release position of the rotary valve 17 the application cylinder pipe 21 is adapted to be opened to the atmosphere through a passage 22 for releasing fluid under pressure from the application portion 14 of the distributing valve device to effect a release of locomotive brakes independently of the brakes on the train. This brake valve device also has the usual lap position as indicated in Fig. 2. A further description of the construction and operation of these parts of the well known 6–ET locomotive brake equipment is not deemed essential in the present application to a clear understanding of the invention.

The delay valve device 9, which according to the invention is adapted to be added to the No. 6–ET locomotive brake equipment for delaying the application of locomotive brakes upon a reduction in brake pipe pressure, is interposed in the usual brake cylinder connection between the application portion 14 of the distributing valve device and the brake cylinder device 8 for retarding the flow of fluid under pressure to the said brake cylinder device in effecting an automatic application of brakes on the locomotive and cars of a train. Accordingly, the delay valve device 9 comprises a casing connected to a pipe 24 leading to the usual brake cylinder connection of the distributing valve device 3 and to a pipe 23 which is connected to the brake cylinder 8.

In the delay valve device are two chambers 25 and 26 which are separated by a wall 27. Pipe 24 is connected to the chamber 25 through the medium of a passage 28 containing a restriction or choke 29 and is also open to the chamber 26 through a passage 30. Pipe 23 connected to the brake cylinder device 8 is open to chamber 25 through a passage 31 and to chamber 26 through a passage 32 and past a check valve 33 which is so disposed as to prevent the flow of fluid from chamber 26 in the direction of the brake cylinder device 8 but to provide for the flow of fluid in the opposite direction.

In chamber 26 there is a valve 36 which is provided with a fluted stem 37 extending through a suitable bore in the wall 27 into chamber 25. A spring 38 in chamber 26 acts on the valve 36 for urging it to its seated position shown.

The upper wall of chamber 25 is formed by a flexible diaphragm 40 which is clamped around its edge in the casing to prevent leakage of fluid under pressure from chamber 25, and which at its center engages the end of valve stem 37. At the upper face of diaphragm 40 is a chamber 41 which is in constant communication with the atmosphere through a breather port 42. The chamber 41 is formed at one side of a movable abutment or piston 43 which is connected to the diaphragm 40 through the medium of a follower plate 44 in chamber 41. At the opposite face of piston 43 is a pressure chamber 45 which is connected by a pipe 46 to the selector cock 10.

The selector cock 10 comprises a casing 48 in which is rotatably mounted a plug valve 49. This valve is connected to a handle 50 which is adapted to be operated to turn said valve to two different controlling positions. One of these positions, adapted to be employed when the locomotive is coupled to a long train, is as shown in the drawing while in the other or short train position, the handle 50 will be located at the dotted line 51.

To the valve casing 48 is connected a pipe 52 which is added to the equipment to provide a constant supply of fluid under pressure from the feed valve device 5 to the selector cock. The selector cock is also connected by a pipe 53, which is added to the equipment, to the independent brake valve device 2. The plug valve 49 has a T-shaped waterway or passage 54 adapted in the long train position shown to establish communication between the pipes 53 and 46 and to close the end of pipe 52. In the short train position of plug valve 49 indicated by the dotted line 51, the passage 54 in the plug valve is adapted to close the end of pipe 53 and to connect pipes 52 and 46.

According to the invention a new passage 55 is added to the independent brake valve device 2 for connecting the pipe 53 to the seat of the rotary valve 17. Further, the rotary valve 17 is modified to provide a cavity 56 for connecting the passage 55 to the atmospheric passage 22 in the running position of the brake valve. The rotary valve 17 is also provided with such additional cavities as required for connecting the passage 55 to the atmospheric passage 22 in release and lap positions and for connecting same to the rotary valve chamber 16 in the slow and quick application positions, these cavities being indicated diagrammatically in Fig. 2 by the reference numerals 60 to 63, respectively, it being noted in Fig. 2 that the cavities 62 and 63 are shown connected to the cavities 11 and 11a, respectively.

*Operation*

In operation, let it be assumed that the selector cock 10 is in the position shown for long train operation and that the brake valve devices 1 and 2 are in their running positions shown. With the automatic brake valve device in running position the brake pipe 12 will be charged with fluid under pressure and the disturbing valve device 3 will be so conditioned that the brake cylinder device 8 will be connected with the atmosphere so that the brakes on the locomotive will be released, in the usual manner.

With the independent brake valve device 2 in its running position shown, the piston chamber 45 in the delay valve device 9 is open to the atmosphere through pipe 46, passage 54 in the selector cock 10, pipe 53, passage 55 in the brake valve device, cavity 56 in the rotary valve 17, and thence through the vent port 22. With chamber 45 thus vented the pressure of spring 38 on the delay valve 36 is adapted to hold the parts of the delay valve device to the position shown in which said delay valve is seated.

Now if the engineer operates the automatic brake valve device 1 to effect a reduction in brake pipe pressure for applying the brakes on the locomotive and cars of the train, the distributing valve device 3 operates in the usual manner to supply fluid under pressure to pipe 24 for supply to the brake cylinder device 8 to apply the locomotive brakes. According to the invention, however, this fluid supplied to pipe 24 when the delay valve 36 is seated has to flow through choke 29, chamber 25, passage 31, and thence through pipe 23 to the brake cylinder device 8 for applying the locomotive brakes. The choke 29 thus acts to restrict the flow of fluid under pressure to the brake cylinder device 8 so as to thereby retard the application of locomotive brakes. The inertia of the locomotive is thereby rendered effective to retard the gathering of slack in the train so that assuming the train to be long the development of violent and damaging shocks will be avoided.

When the engineer desires to recharge the brake pipe 12 to effect a release of brakes on the locomotive and cars of a train the automatic brake valve device 1 is returned to running position. The distributing valve device 3 then responds to the increase in brake pipe pressure in the usual manner and opens communication between the brake cylinder pipe 24 and the atmosphere for thereby releasing fluid under pressure from the brake cylinder device 8 to release the locomotive brakes. This release of fluid from said brake cylinder device 8 occurs through passage 32 past the check valve 33 and thence through chamber 26, passage 30, and pipe 24 and is thus independent of the delay choke 29 so as to provide a normal rate of release of locomotive brakes.

If the engineer desires to apply the brakes on the locomotive independently of those on the train when the selector cock 10 is in the long train position shown, he may operate the handle 18 of the independent brake valve device to turn the rotary valve 17 to either slow application position or quick application position, as desired, for supplying fluid under pressure from the rotary valve chamber 16 through either cavity 11 or cavity 11a, respectively, to the application cylinder pipe 21 through which it is adapted to flow to and effect the operation of the application portion 14 of the distributing valve device to supply fluid at a corresponding pressure to the brake cylinder pipe 24.

In both application positions of rotary valve 17 pipe 53 is also open to the rotary valve chamber 16 through passage 55 and either cavity 62 or 63, as shown in Fig. 2, so that fluid under pressure is supplied from said chamber through the selector cock 10 to piston chamber 45 in the delay valve device 9. The pressure of fluid thus obtained in chamber 45 and acting on the piston 43 is adapted to move said piston in a downwardly direction against the opposing pressure of spring 38 and to a position defined by contact between diaphragm 40 and stops 57. The valve 36 is thereby unseated to open communication between chambers 26 and 25 by-passing the choke 29, so that the fluid under pressure supplied to pipe 24 by operation of the distributing valve device will flow to the brake cylinder device 8 through the choke 29 and at the same time past the valve 36 at the rate supplied by the distributing valve device. It will thus be apparent that while the choke 29 acts to restrict the rate of brake application on long trains with the valve 36 seated, the unseating of said valve upon movement of the independent brake valve device to an application position opens a by-pass around said choke to provide the normal and faster rate of brake application for controlling the brakes on the locomotive independently of the train brakes.

To release an application of brakes on the locomotive independently of the brake pipe, the independent brake valve device may be moved to running position in which the release of fluid from the application portion of the distributing valve device will occur through the distributing valve release pipe 19 and pipe 20 connected to the automatic brake valve device 1, or the independent brake valve device may be moved to release position and connect the application cylinder pipe 21 to the vent port 22 for releasing fluid under pressure from the application portion 14 of the distributing valve device. In either case the application portion of the distributing valve device operates in the usual manner to vent pipe 24 and a release of fluid under pressure from the brake cylinder 8 will then occur at the usual rate past check valve 33.

If the locomotive is coupled to a short train it is not necessary to retard the application of locomotive brakes when applying the brakes on the train. The selector cock 10 is therefore turned from the position shown to its other or short train position indicated by the dotted line 51. In the latter position passage 54 through the plug valve 48 is moved out of registry with pipe 53 and connects pipe 52, supplied with fluid under pressure from the feed valve device 5, to pipe 46 leading to the piston chamber 45 in the delay valve device so that feed valve pressure may act on piston 43 to move the valve 36 to and hold same in open position. With the valve 36 open the rate at which fluid pressure will be supplied to the brake cylinder device 8 by operation of both brake valve devices is governed by the distributing valve device 3 in the usual manner and is therefore at the usual rate.

*Summary*

It will now be apparent that the delay valve device 9 arranged to control the supply of fluid under pressure from the distributing valve device 3 to the brake cylinder device 8 is adapted to restrict or retard such supply and thus hold back the application of locomotive brakes so as to avoid harsh slack action in long trains, and it is also adapted to provide for a normal rate of brake application on a locomotive when coupled to a short train, dependent upon the position of the selector cock 10. It will also be noted that when the selector cock is in position for long train operation, operation of the independent brake valve device to either of its brake application positions automatically conditions the delay valve device 9 so as to provide the normal rate of independent brake application on the locomotive. In other words, the delay valve device 9 provides for retarding the application of locomotive brakes under one specific condition, but under all conditions it provides for normal operation of the locomotive brake equipment. The passage 32 and check valve 33 act to by-pass the choke 29 to provide for a normal rate of release of fluid under pressure from the brake cylinder device 8 by operation of either brake valve device, said check valve being provided to prevent flow of fluid under pressure around the choke 29 to the brake cylinder device when it is desired that said choke be effective to retard the application of locomotive brakes.

It will further be noted that these improvements may be obtained in the well known No. 6–ET locomotive brake equipment merely by adding to said equipment the delay valve device 9 and selector cock 10 and by the provision of passage 55 in the casing of the independent brake valve device 2 and such cavities in the rotary valve 17 as required to connect up with said passage in the different positions of the brake valve device as above described and indicated in Fig. 2.

While only one embodiment of the invention has been shown and described in detail it is not the intention to limit the scope to that embodiment or otherwise than by the terms of the appended claims.

Having now described my invention, what I claim as new and desire to secure by Letters Patent, is:

1. A locomotive brake equipment comprising in combination, a brake pipe, a brake cylinder device, a valve device operative upon a reduction in brake pipe pressure to effect a supply of fluid under pressure to said brake cylinder device to effect an application of locomotive brakes and operative upon an increase in brake pipe pressure to effect a release of fluid under pressure from said brake cylinder device to effect a release of locomotive brakes, means arranged to control said supply of fluid under pressure to said brake cylinder device and operative to provide different rates of such supply, an independent brake valve device controlling said means and operative in one position to condition said means to provide a relatively slow rate of supply and in another position a faster rate of supply, and a one-way flow communication connected around said means to provide for said release of fluid under pressure from said brake cylinder device independently of said means.

2. A locomotive brake equipment comprising in combination, a brake pipe, a brake cylinder device, a valve device operative upon a reduction in brake pipe pressure to effect a supply of fluid under pressure to said brake cylinder device to effect an application of locomotive brakes and operative upon an increase in brake pipe pressure to effect a release of fluid under pressure from said brake cylinder device to effect a release of locomotive brakes, a choke in the communication between said valve device and brake cylinder device for limiting the rate of supply of fluid under pressure to said brake cylinder device, an independent brake valve device having a normal position for rendering said choke effective and having a brake application position, means operative upon movement of said independent brake valve device to said brake application position to render said choke ineffective, and one-way flow means connected to said communication at opposite sides of said choke providing for release of fluid under pressure from said brake cylinder device by said valve device independent of said choke.

3. A locomotive brake equipment comprising in combination, a brake pipe, a brake cylinder device, a valve device operative upon a reduction in brake pipe pressure to effect a supply of fluid under pressure to said brake cylinder device to effect an application of locomotive brakes and operative upon an increase in brake pipe pressure to effect a release of fluid under pressure from said brake cylinder device to effect a release of locomotive brakes, a choke in the communication between said valve device and the brake cylinder device for retarding the flow of fluid under pressure to said brake cylinder device to a degree less than normal, and a selector cock movable to either of two positions and operative in one of said positions to render said choke effective and in the other position ineffective and one-way flow means connected to said communication at opposite sides of said choke providing for release of fluid under pressure from said brake cylinder device by said valve device independent of said choke.

4. A locomotive brake equipment comprising in combination, a brake pipe, a brake cylinder device, a valve device operative upon a reduction in brake pipe pressure to effect a supply of fluid under pressure to said brake cylinder device to effect an application of locomotive brakes and operative upon an increase in brake pipe pressure to effect a release of fluid under pressure from said brake cylinder device to release the locomotive brakes, means in the communication between said valve device and brake cylinder device for retarding the flow of fluid under pressure to said brake cylinder device to a degree less than normal, and a one-way flow communication by-passing said means providing for a normal rate of release of fluid under pressure from said brake cylinder device.

5. A locomotive brake equipment comprising in combination, a brake pipe, a brake cylinder device, a valve device operative upon a reduction in brake pipe pressure to effect a supply of fluid under pressure to said brake cylinder device to effect an application of locomotive brakes and upon an increase in brake pipe pressure to effect a release of fluid under pressure from said brake cylinder device to release the locomotive brakes, delay valve means controlling communication between said valve device and brake cylinder device, said delay valve means comprising a choke for restricting the flow of fluid under pressure from said valve device to said brake cylinder device to a rate less than normal, a valve operative to open a communication around said choke to provide for a normal rate of flow of fluid under pressure from said valve device to said brake cylinder device, an independent brake valve device movable to a brake application position for effecting a supply of fluid under pressure through said delay valve means to said brake cylinder device and also operable in said position to effect operation of said valve to open said by-pass, said independent brake valve device being movable to another position for releasing fluid under pressure from said brake cylinder device through said delay valve means and for rendering said valve operative to close said by-pass, and a one-way flow communication around said choke providing for a normal rate of release of fluid under pressure from said brake cylinder device through said delay valve means.

6. A locomotive brake equipment comprising in combination, a brake pipe, a brake cylinder device, a distributing valve device operative upon a reduction in brake pipe pressure to supply fluid under pressure to said brake cylinder device to effect an application of locomotive brakes and operative upon an increase in brake pipe pressure to release fluid under pressure from said brake cylinder device to effect a release of locomotive brakes, valve means in the communication between said distributing valve device and brake cylinder device for controlling the rate of flow of fluid under pressure to said brake cylinder device, an independent brake valve device controlling said valve means and operative in one position to condition said valve means to provide a relatively slow rate of flow of fluid to said brake cylinder device and in another position a faster rate of flow of fluid to said brake cylinder device, a selector valve controlling communication between the brake valve device and valve means and having one position for rendering said valve means controllable by said independent brake valve device and movable to another position to condition said valve means to provide said faster rate of flow of fluid to said brake cylinder device independently of said brake valve device, and means providing for one-way flow of fluid around said valve means in the direction from said brake cylinder device to said distributing valve device for releasing fluid under pressure from said brake cylinder device.

7. A locomotive brake equipment comprising in combination, a brake pipe, a brake cylinder device, a distributing valve device operative upon a reduction in brake pipe pressure to supply fluid under pressure to said brake cylinder device to effect an application of locomotive brakes, and upon an increase in brake pipe pressure to effect a release of fluid under pressure from said brake cylinder device, a choke arranged in the communication between said valve device and brake cylinder device operative to restrict the rate of supply of fluid under pressure to said brake cylinder device, a valve controlling a communication around said choke of greater flow capacity than said choke, and an independent brake valve device for controlling said valve, said brake valve device having a normal position for effecting operation of said valve to close the communication controlled thereby and having a brake applying position for effecting operation of said valve to open said communication and for also effecting operation of said distributing valve device to supply fluid under pressure to said brake cylinder device, said brake valve device having still another position for effecting operation of said distributing valve device to release fluid under pressure from said brake cylinder device, and a one-way flow communication of greater flow capacity than said choke by-passing said choke and providing for the release of fluid under pressure from said brake cylinder device independently of said choke.

8. A locomotive brake equipment comprising in combination, a brake pipe, a brake cylinder device, a distributing valve device operative upon a reduction in brake pipe pressure to supply fluid under pressure to said brake cylinder device to effect an application of locomotive brakes, and upon an increase in brake pipe pressure to effect a release of fluid under pressure from said brake cylinder device, a choke arranged in the communication between said valve device and brake cylinder device operative to restrict the rate of supply of fluid under pressure to said brake cylinder device, a valve controlling a communication around said choke of greater flow capacity than said choke, and an independent brake valve device for controlling said valve, said brake valve device having a normal position for effecting operation of said valve to close the communication controlled thereby and having a brake applying position for effecting operation of said valve to open said communication and for also effecting operation of said distributing valve device to supply fluid under pressure to said brake cylinder device, said brake valve device having still another position for effecting operation of said distributing valve device to release fluid under pressure from said brake cylinder device, a one-way flow communication of greater flow capacity than said choke by-passing said choke and providing for the release of fluid under pressure from said brake cylinder device independently of said choke, and a manually operable selector cock controlling communication through which said valve is controlled by said brake valve device and having one position for rendering said valve controllable by said brake valve device and another position non-controllable and operative in said other position to effect operation of said valve to open the communication controlled thereby.

9. In a fluid pressure brake, in combination, a brake cylinder device, valve means operative to supply fluid under pressure to said brake cylinder device and to release fluid under pressure therefrom, a delay valve device in the communication between said brake cylinder device and valve means and having a chamber open to said brake cylinder device and to said valve means, a choke in the communication between said valve means and chamber for restricting flow of fluid under pressure from said valve means to said brake cylinder device, a one-way flow communication connected around said choke to provide a more rapid rate of flow of fluid under pressure in the direction from said brake cylinder device to said valve means, a valve controlling a communication around said choke and operative when open to provide a more rapid rate of flow of fluid from said valve means to said brake cylinder device than provided by said choke, and a movable abutment operative in accordance with variations in pressure in a chamber for controlling the opening and closing of said valve, and means for controlling the variations in pressure in said chamber.

10. A valve device for controlling the flow of fluid under pressure between two pipes comprising a casing having a chamber open to both of said pipes, a choke in the connection between said chamber and one of said pipes for restricting the flow of fluid under pressure in the direction from said one pipe to the other of said pipes, means including a chamber providing a communication between said pipes by-passing said choke, a check valve arranged in said communication to prevent the flow of fluid under pressure from said one pipe to the said other pipe but providing for the flow of fluid under pressure in the opposite direction, a wall separating said chambers and having a bore providing communication therebetween, a valve in the second named chamber arranged to control communication through said bore, spring means acting on said valve for actuating same to close the communication controlled thereby, a movable abutment having at one side a pressure chamber and at the opposite side a non-pressure chamber and means providing an operating connection between said abutment and valve including a flexible diaphragm clamped around its edge and providing one wall of the first named chamber, said movable abutment being operative upon supply of fluid under pressure to said pressure chamber to unseat said valve against said spring, said spring being operative to seat said valve upon the release of fluid under pressure from said pressure chamber, and means for controlling the supply and release of fluid under pressure to and from said pressure chamber.

11. In combination, a brake pipe, a brake cylinder device, a distributing valve device of a No. 6-ET locomotive brake equipment operative upon a reduction in pressure in said brake pipe to supply fluid under pressure to said brake cylinder device to effect an application of locomotive brakes and operative upon an increase in brake pipe pressure to release fluid under pressure from said brake cylinder device to effect a release of locomotive brakes, an independent brake valve device of a No. 6-ET locomotive brake equipment having a running position for controlling the release of fluid under pressure from said brake cylinder device upon operation of said distributing valve device in response to an increase in brake pipe pressure, said brake valve device having an application position for effecting operation of said distributing valve device to supply fluid under pressure to said brake cylinder device independently of said brake pipe and also having a release position for effecting operation of said distributing valve device to release fluid under pressure from said brake cylinder device independently of said brake pipe, delay valve means interposed in the communication between said distributing valve device and brake cylinder device embodying a choke for restricting to a certain rate the flow of fluid under pressure from said distributing valve device to said brake cylinder device, a one-way flow communication by-passing said choke arranged to provide a faster rate of flow of fluid under pressure from said brake cylinder device in the direction of said distributing valve device, another communication by-passing said choke adapted to provide for flow of fluid under pressure from said distributing valve device to said brake cylinder device at a rate faster than said choke, and a valve for opening and closing the last named communication, said brake valve device being modified to control said valve and operative in said running position to effect operation of said valve to close the communication controlled thereby and in said application position to effect operation of said valve to open the communication controlled thereby.

12. In combination, a brake pipe, a brake cylinder device, a distributing valve device of a No. 6-ET locomotive brake equipment operative upon a reduction in pressure in said brake pipe to supply fluid under pressure to said brake cylinder device to effect an application of locomotive brakes and operative upon an increase in brake pipe pressure to release fluid under pressure from said brake cylinder device to effect a release of locomotive brakes, an independent brake valve device of a No. 6-ET locomotive brake equipment having a running position for controlling the release of fluid under pressure from said brake cylinder device upon operation of said distributing valve device in response to an increase in brake pipe pressure, said brake valve device having an application position for effecting operation of said distributing valve device to supply fluid under pressure to said brake cylinder device independently of said brake pipe and also having a release position for effecting operation of said distributing valve device to release fluid under pressure from said brake cylinder device independently of said brake pipe, delay valve means interposed in the communication between said distributing valve device and brake cylinder device embodying a choke for restricting to a certain rate the flow of fluid under pressure from said distributing valve device to said brake cylinder device, a one-way flow communication by-passing said choke arranged to provide a faster rate of flow of fluid under pressure from said brake cylinder device in the direction of said distributing valve device, another communication by-passing said choke adapted to provide for flow of fluid under pressure from said distributing valve device to said brake cylinder device at a rate faster than said choke, and a valve for opening and closing the last named communication, said brake valve device being modified to control said valve and operative in said running position to effect operation of said valve to close the communication controlled thereby and in said application position to effect operation of said valve to open the communication controlled thereby, and a manually operable selector cock having one position rendering said valve controllable by said brake valve device and another position for rendering said valve non-controllable by said brake valve device and for effecting operation of said valve to open the communication controlled thereby.

CLYDE C. FARMER.